(12) United States Patent
Penrod et al.

(10) Patent No.: US 12,556,849 B2
(45) Date of Patent: Feb. 17, 2026

(54) AUDIO COMPONENT DRAINAGE SYSTEM FOR IMAGE CAPTURE DEVICE

(71) Applicant: GoPro, Inc., San Mateo, CA (US)

(72) Inventors: Eric Penrod, Brentwood, CA (US); Nicholas Vitale, Foster City, CA (US); Adrian Santos, Dublin, CA (US)

(73) Assignee: GoPro, Inc., San Mateo, CA (US)

( * ) Notice: Subject to any disclaimer, the term of this patent is extended or adjusted under 35 U.S.C. 154(b) by 337 days.

(21) Appl. No.: 18/195,076

(22) Filed: May 9, 2023

(65) Prior Publication Data
US 2023/0276155 A1 Aug. 31, 2023

Related U.S. Application Data

(63) Continuation of application No. 17/073,727, filed on Oct. 19, 2020, now Pat. No. 11,665,457, which is a continuation-in-part of application No. 16/372,611, filed on Apr. 2, 2019, now Pat. No. 10,812,899.

(51) Int. Cl.
*H04R 1/02* (2006.01)
*G03B 17/08* (2021.01)

(52) U.S. Cl.
CPC ............ *H04R 1/028* (2013.01); *G03B 17/08* (2013.01); *H04R 1/023* (2013.01); *H04R 2201/029* (2013.01); *H04R 2499/11* (2013.01)

(58) Field of Classification Search
CPC .. H04R 1/028; H04R 1/023; H04R 2210/029; H04R 2499/11; G03B 17/08
See application file for complete search history.

(56) References Cited

U.S. PATENT DOCUMENTS

| | | | | |
|---|---|---|---|---|
| 8,456,847 B2* | 6/2013 | Hwang | ............... | H04M 1/0249 |
| | | | | 455/575.4 |
| 8,587,934 B2* | 11/2013 | Aihara | ................... | H04N 23/51 |
| | | | | 361/679.01 |
| 9,084,053 B2* | 7/2015 | Parkins | .................. | H04R 1/086 |
| 9,769,364 B2 | 9/2017 | Jing | | |
| 9,788,620 B1* | 10/2017 | Parkinson | ............. | A45C 11/00 |
| 10,203,588 B2 | 2/2019 | Clyne | | |
| 10,812,899 B1 | 10/2020 | Penrod | | |
| 2005/0179813 A1* | 8/2005 | Fujii | ...................... | H04N 23/51 |
| | | | | 348/E5.026 |
| 2005/0219808 A1* | 10/2005 | Marler | .................. | H04B 1/086 |
| | | | | 361/679.23 |
| 2005/0220448 A1* | 10/2005 | Tei | ......................... | H04M 1/18 |
| | | | | 396/25 |

(Continued)

FOREIGN PATENT DOCUMENTS

| | | | | | |
|---|---|---|---|---|---|
| GB | | 2507187 A | * | 4/2014 | ............ G03B 17/08 |
| JP | | 2009005043 A | | 1/2009 | |

(Continued)

*Primary Examiner* — Oyesola C Ojo
(74) *Attorney, Agent, or Firm* — Young Basile Hanlon & MacFarlane, P.C.

(57) ABSTRACT

An image capture device includes a housing that defines a cavity and an aperture positioned within the cavity and an audio device disposed within the housing at a location of the aperture. The image capture device includes stanchions that extend outward from the cavity and a cover coupled to the stanchions. The cover is free of contact with the housing.

20 Claims, 9 Drawing Sheets

(56) References Cited

U.S. PATENT DOCUMENTS

| | | | |
|---|---|---|---|
| 2008/0245452 A1* | 10/2008 | Law | G03B 17/08 |
| | | | 206/316.2 |
| 2013/0028464 A1* | 1/2013 | Hayashi | H04R 1/023 |
| | | | 381/391 |
| 2017/0006195 A1* | 1/2017 | Tisch | H04R 3/005 |
| 2017/0006396 A1 | 1/2017 | Jing | |
| 2018/0081258 A1* | 3/2018 | Clyne | G06F 3/16 |
| 2018/0084339 A1* | 3/2018 | Asuncion | H04N 1/00119 |
| 2019/0072903 A1* | 3/2019 | Park | G04G 13/00 |
| 2019/0082083 A1* | 3/2019 | Jarvis | H04N 23/55 |
| 2019/0327547 A1 | 10/2019 | Zaba | |
| 2020/0112786 A1* | 4/2020 | Castro | G06F 21/83 |
| 2020/0322720 A1 | 10/2020 | Penrod | |
| 2021/0012638 A1* | 1/2021 | Jalilian | G08B 21/20 |
| 2021/0105549 A1 | 4/2021 | Penrod | |

FOREIGN PATENT DOCUMENTS

| | | |
|---|---|---|
| JP | 2011171924 A | 9/2011 |
| JP | 2013190859 A | 9/2013 |
| JP | 2016152485 A | 8/2016 |

* cited by examiner

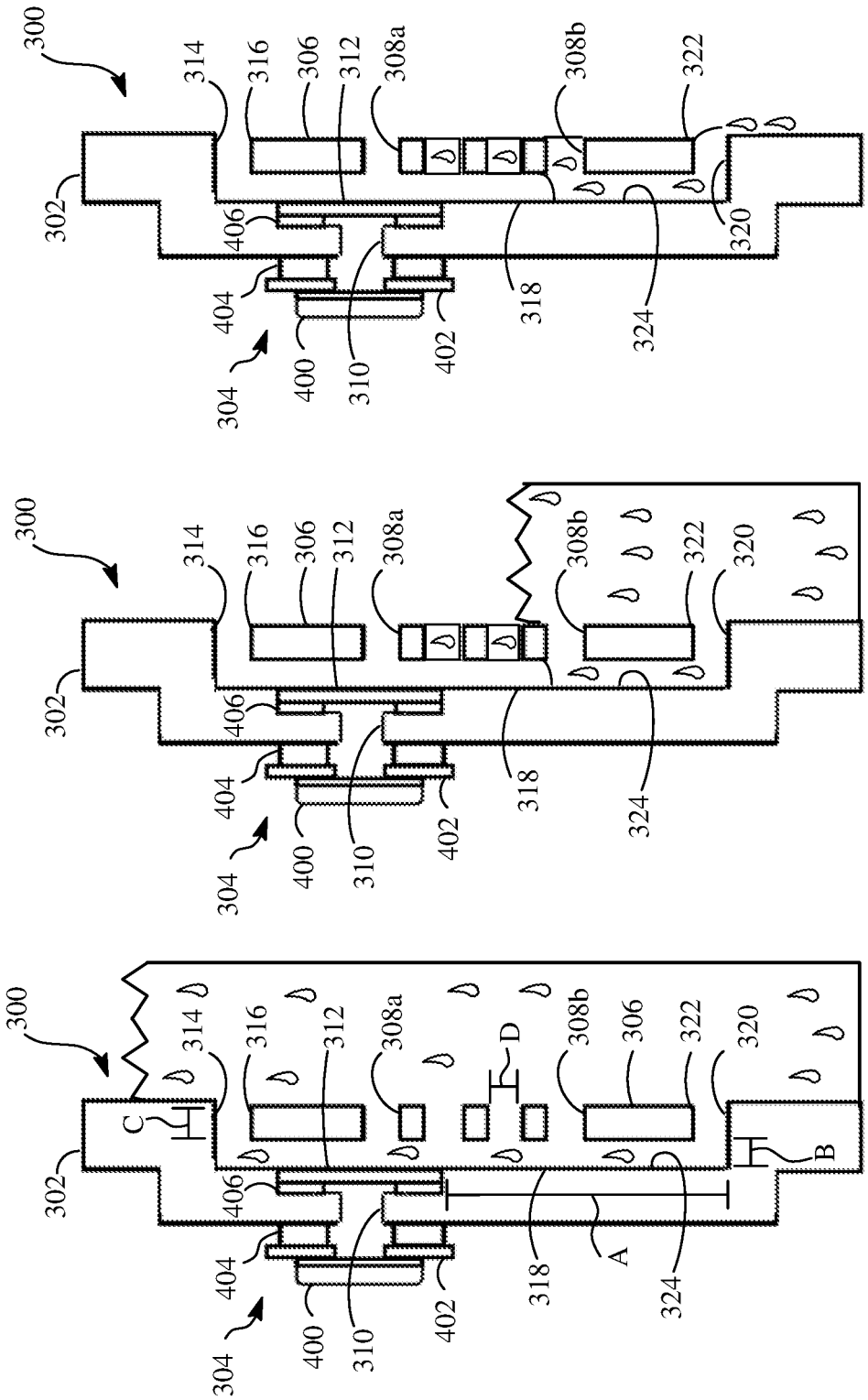

AUDIO COMPONENT DRAINAGE SYSTEM FOR IMAGE CAPTURE DEVICE

CROSS-REFERENCE TO RELATED APPLICATION(S)

This application is a continuation of U.S. application Ser. No. 17/073,727, filed on Oct. 19, 2020, which is a continuation-in-part of U.S. patent application Ser. No. 16/372,611, filed on Apr. 2, 2019, now U.S. Pat. No. 10,812,899, the entire disclosures of which are hereby incorporated by reference.

TECHNICAL FIELD

This disclosure relates generally to an audio system for a submersible device. More specifically, this disclosure relates to a drainage system for a microphone or a speaker that moves liquid away from the microphone or the speaker after the device emerges from water.

BACKGROUND

Photography during physical activity has been improved by use of simple-to-operate, lightweight, compact cameras. These cameras can be used in a variety of environments, including environments where the camera will be exposed to water such as beaches, lakes, pools, oceans, etc. In these environments, the camera can be splashed, submerged, or otherwise inundated with water, impacting performance of an audio assembly within the camera that relies on air as a transmission medium to provide ambient audio, for example, in the form of audio signals and/or sound waves to the audio assembly. The presence of liquids such as water can distort or block the ambient audio from reaching the audio assembly within the camera.

SUMMARY

Disclosed herein are implementations of an audio component drainage system for an electronic device.

In one embodiment, a device includes an audio assembly and a housing defining an aperture that interfaces with the audio assembly at an interior surface of the housing. The device includes stanchions coupled to an exterior surface of the housing at a location of the aperture and a cover coupled to the stanchions and free of contact with the housing. The device includes a drainage channel extending between the cover, the exterior surface of the housing, and the stanchions. The drainage channel includes a first portion defining an inlet of the drainage channel, and the first portion has a first width defined by the stanchions. The drainage channel includes a second portion defining an outlet of the drainage channel, and the second portion has a second width defined by the stanchions. The stanchions are tapered in shape so that the first width is wider than the second width.

In one embodiment, a drainage system includes a cover depression having an upper level and a lower level defined in a housing of a device, and the upper level extends across an aperture defined through the housing and being staggered in depth into the housing relative to the lower level. The device includes an audio assembly positioned at a location of the aperture. The drainage system includes a cover extending over the cover depression to define a drainage channel that extends from an inlet, over the audio assembly, across the upper level and the lower level of the cover depression, and to an outlet to drain moisture from the audio assembly. The inlet interfaces with the upper level, and the outlet interfaces with the lower level.

In one embodiment, an image capture device includes a housing including an exterior surface defining a depression, an opening within the depression, and a sloped structure along the depression. The image capture device includes an audio assembly disposed adjacent to the opening and a cover coupled with the housing over the depression. The image capture device includes an inlet positioned between a first edge of the cover and the housing, and the inlet is used to facilitate a flow of liquid within the depression and over the audio assembly. The image capture device includes an outlet positioned between a second edge of the cover and the housing, and the outlet is used to facilitate the flow of the liquid across the audio assembly and out of the depression. The image capture device includes a drainage channel fluidly connecting the inlet and the outlet between the housing and the cover, and a shape of the drainage channel tapers from the inlet to the outlet.

In one embodiment, an image capture device includes a housing that defines a cavity and an aperture positioned within the cavity and an audio device disposed within the housing at a location of the aperture. The image capture device includes stanchions that extend outward from the cavity and a cover coupled to the stanchions. The cover is free of contact with the housing.

In one embodiment, an image capture device includes a housing that includes a receptable. The image capture device includes an audio device disposed within the receptacle to receive and/or emit audio waves. The image capture device includes a cover that includes a pattern of apertures and is connected with the housing over the audio device. The image capture device includes a channel in fluid communication with an external environment and that extends over the audio device and between the cover and the housing. The channel and the pattern of apertures drain fluids from the audio device.

In one embodiment, an image capture device includes a housing and an audio aperture defined within the housing. The audio aperture includes an audio device. The image capture device includes a cover connected with the housing and positioned over the audio aperture and configured to protect the audio device. The image capture device includes a channel that extends from an inlet, between the cover and audio aperture, and to an outlet. The channel defines the outlet as perpendicular relative inlet and a top surface of the cover.

Additional embodiments are described in further detail below.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 4A-4C are sectional views of the drainage system of FIGS. 3A-3B as the drainage system moves from submerged in water to emerged from water.

DETAILED DESCRIPTION

Performance of an audio assembly disposed within a housing of an image capture device or other electronic device with audio components can be improved using an efficiently-designed drainage system that both allows ambient audio (e.g. audio signals and/or sound waves) to reach the audio assembly and moves moisture away from the audio assembly. For example, an image capture device using a drainage system can include a housing defining an audio aperture and an audio assembly coupled to the housing at a location of the audio aperture. The drainage system can include a cover coupled to the housing, with the cover configured to protect the audio assembly from an environment external to the image capture device. The cover can define apertures that allow both air and liquid to flow through the cover to reach the audio assembly. The drainage system can include a drainage channel defined between the cover and the housing that is configured to allow air to reach the audio assembly and to drain moisture from the audio assembly when the image capture device emerges from a liquid such as water.

Figure 1A:
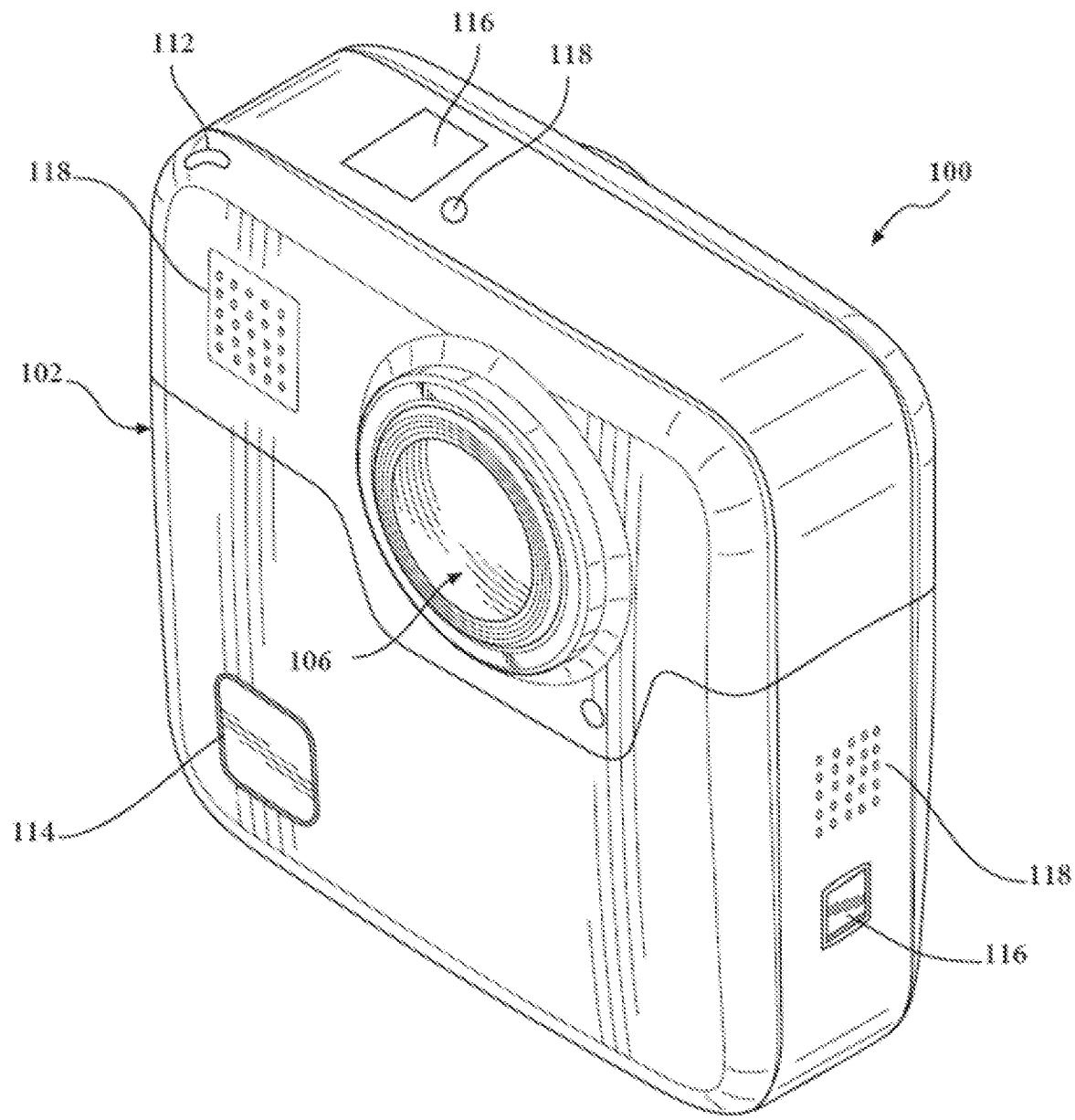
FIGS. 1A-1B are isometric views of an example of an image capture device.
Figure 1B:
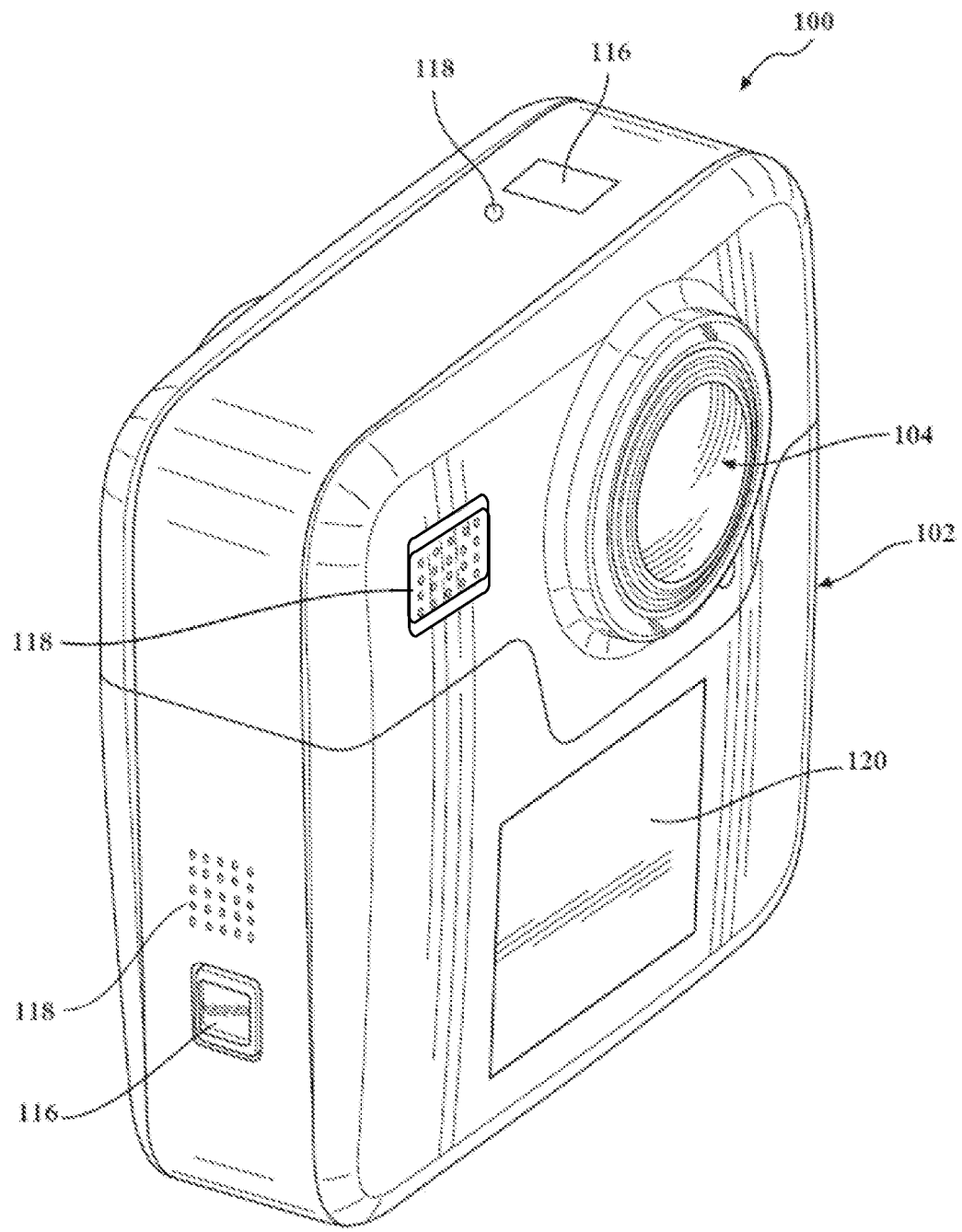

FIGS. 1A-B illustrate an example of an image capture device 100. The image capture device 100 includes a housing or body 102 and two camera lenses 104, 106 disposed on opposing surfaces of the body 102, for example, in a back-to-back or Janus configuration.

The image capture device may include electronics (e.g., imaging electronics, power electronics, etc.) internal to the body 102 for capturing images via the lenses 104, 106 and/or performing other functions. The image capture device may include various indicators such as an LED light 112 and an LCD display 114.

The image capture device 100 may include various input mechanisms such as buttons, switches, and touchscreen mechanisms. For example, the image capture device 100 may include buttons 116 configured to allow a user of the image capture device 100 to interact with the image capture device 100, to turn the image capture device 100 on, and to otherwise configure the operating mode of the image capture device 100. In an implementation, the image capture device 100 includes a power button and a mode button. It should be appreciated, however, that, in alternate embodiments, the image capture device 100 may include additional buttons to support and/or control additional functionality.

The image capture device 100 may also include one or more audio components 118 such as microphones configured to receive and record audio signals (e.g., voice or other audio commands) in conjunction with recording video or in connection with audible control commands and/or speakers configured to provide alerts or notifications. In the example shown in FIGS. 1A and 1B, four audio components 118 are shown using representative patterns of apertures or depressions extending partially into or fully through the housing or body 102, though any number of audio components 118, such as one, two, four, or six may be used. The apertures or depressions may be a combination of design features formed as depressions in the housing or body 102 and apertures that extend fully through the housing or body 102. The patterns of apertures and depressions are designed to allow the audio components 118, for example, microphones, that are disposed within the housing or body 102 proximate to locations of the apertures and depressions (i.e., nearby) to capture ambient audio from an environment external to the housing or body 102 of the image capture device 100.

The image capture device 100 may include an interactive display 120 that allows for interaction with the image capture device 100 while simultaneously displaying information on a surface of the image capture device 100.

The image capture device 100 may be made of a rigid material such as plastic, aluminum, steel, or fiberglass. In some embodiments, the image capture device 100 described herein includes features other than those described. For example, instead of or in addition to the interactive display 120, the image capture device 100 may include additional interfaces or different interface features such as I/O interfaces. In another example, the image capture device 100 may include additional buttons or different interface features, such as interchangeable lenses, cold shoes, and hot shoes that can add functional features to the image capture device 100, etc. In another example, the image capture device 100 may include a single image sensor and/or lens or more than two image sensors and/or lenses.

Figure 1C:
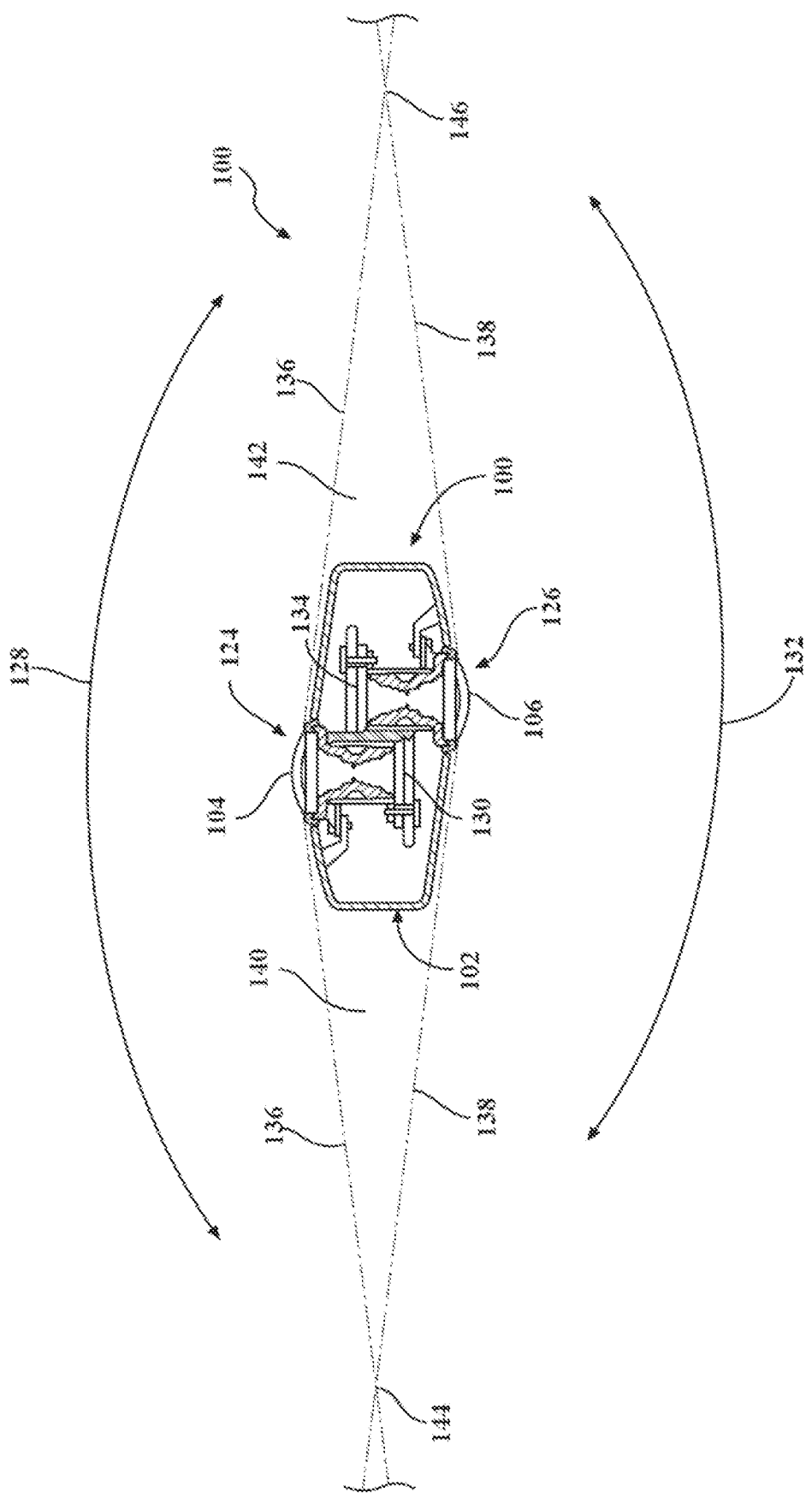
FIG. 1C is a cross-sectional view of the image capture device of FIGS. 1A-B.

FIG. 1C is a cross-sectional view of the image capture device 100 of FIGS. 1A-B. The image capture device 100 is configured to capture spherical images, and accordingly, includes a first image capture device 124 and a second image capture device 126. The first image capture device 124 defines a first field-of-view 128 as shown in FIG. 1C and includes the lens 104 that receives and directs light onto a first image sensor 130.

Similarly, the second image capture device 126 defines a second field-of-view 132 as shown in FIG. 1C and includes the lens 106 that receives and directs light onto a second image sensor 134. To facilitate the capture of spherical images, the image capture devices 124, 126 (and related components) may be arranged in a back-to-back (Janus) configuration such that the lenses 104, 106 face in generally opposite directions.

The fields-of-view 128, 132 of the lenses 104, 106 are shown above and below boundaries 136, 138, respectively. Behind the first lens 104, the first image sensor 130 may capture a first hyper-hemispherical image plane from light entering the first lens 104, and behind the second lens 106, the second image sensor 134 may capture a second hyper-hemispherical image plane from light entering the second lens 106.

One or more areas, such as blind spots 140, 142 may be outside of the fields-of-view 128, 132 of the lenses 104, 106 so as to define a "dead zone." In the dead zone, light may be obscured from the lenses 104, 106 and the corresponding image sensors 130, 134, and content in the blind spots 140, 142 may be omitted from capture. In some implementations, the image capture devices 124, 126 may be configured to minimize the blind spots 140, 142.

The fields-of-view 128, 132 may overlap. Stitch points 144, 146, proximal to the image capture device 100, at which the fields-of-view 128, 132 overlap may be referred to herein as overlap points or stitch points. Content captured by the respective lenses 104, 106, distal to the stitch points 144, 146, may overlap.

Images contemporaneously captured by the respective image sensors 130, 134 may be combined to form a combined image. Combining the respective images may include correlating the overlapping regions captured by the respective image sensors 130, 134, aligning the captured fields-of-view 128, 132, and stitching the images together to form a cohesive combined image.

A slight change in the alignment, such as position and/or tilt, of the lenses 104, 106, the image sensors 130, 134, or both, may change the relative positions of their respective fields-of-view 128, 132 and the locations of the stitch points 144, 146. A change in alignment may affect the size of the blind spots 140, 142, which may include changing the size of the blind spots 140, 142 unequally.

Incomplete or inaccurate information indicating the alignment of the image capture devices 124, 126, such as the locations of the stitch points 144, 146, may decrease the accuracy, efficiency, or both of generating a combined image. In some implementations, the image capture device 100 may maintain information indicating the location and orientation of the lenses 104, 106 and the image sensors 130, 134 such that the fields-of-view 128, 132, stitch points 144, 146, or both may be accurately determined, which may improve the accuracy, efficiency, or both of generating a combined image.

The lenses 104, 106 may be laterally offset from each other, may be off-center from a central axis of the image capture device 100, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 100 may be close to the length of a single lens barrel as opposed to twice the length of a single lens barrel as in a back-to-back configuration. Reducing the lateral distance between the lenses 104, 106 may improve the overlap in the fields-of-view 128, 132.

Images or frames captured by the image capture devices 124, 126 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 2:
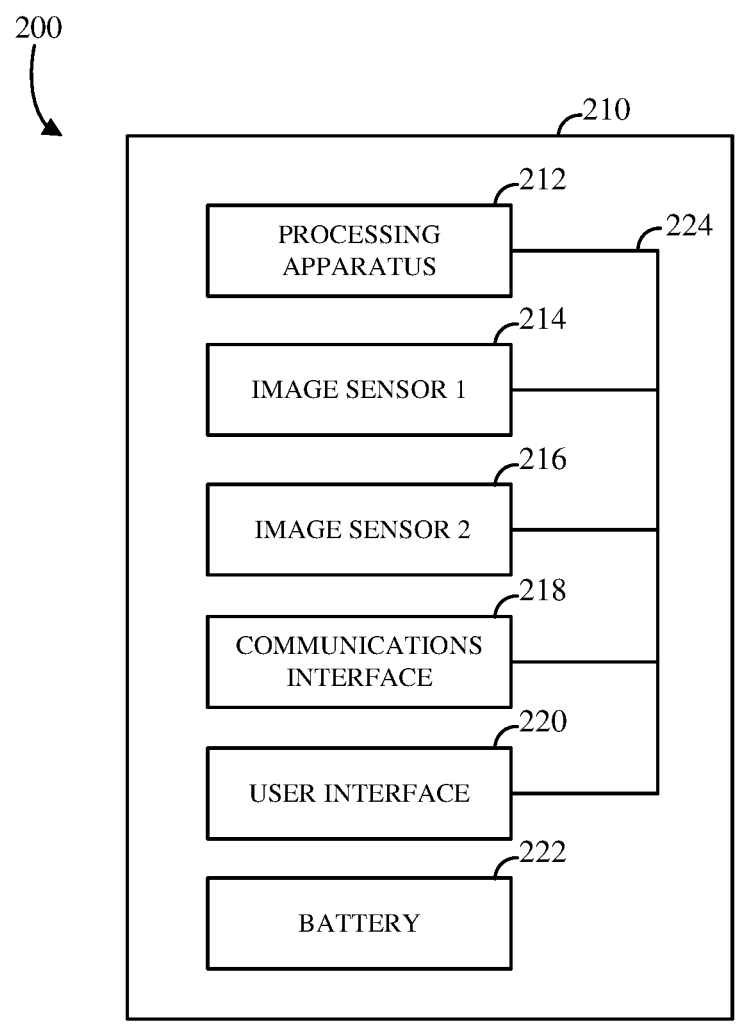
FIG. 2 is a block diagram of an example of an image capture system.

FIG. 2 is a block diagram of an example of an image capture system 200. The image capture system 200 includes an image capture device 210 which may, for example, be the image capture device 100 shown in FIGS. 1A-C.

The image capture device 210 includes a processing apparatus 212 that is configured to receive a first image from a first image sensor 214 and receive a second image from a second image sensor 216. The image capture device 210 includes a communications interface 218 for transferring images to other devices. The image capture device 210 includes a user interface 220 to allow a user to control image capture functions and/or view images. The image capture device 210 includes a battery 222 for powering the image capture device 210. The components of the image capture device 210 may communicate with each other via the bus 224.

The processing apparatus 212 may be configured to perform image signal processing (e.g., filtering, tone mapping, stitching, and/or encoding) to generate output images based on image data from the image sensors 214 and 216. The processing apparatus 212 may include one or more processors having single or multiple processing cores. The processing apparatus 212 may include memory, such as a random-access memory device (RAM), flash memory, or another suitable type of storage device such as a non-transitory computer-readable memory. The memory of the processing apparatus 212 may include executable instructions and data that can be accessed by one or more processors of the processing apparatus 212.

For example, the processing apparatus 212 may include one or more dynamic random access memory (DRAM) modules, such as double data rate synchronous dynamic random-access memory (DDR SDRAM). In some implementations, the processing apparatus 212 may include a digital signal processor (DSP). In some implementations, the processing apparatus 212 may include an application specific integrated circuit (ASIC). For example, the processing apparatus 212 may include a custom image signal processor.

The first image sensor 214 and the second image sensor 216 may be configured to detect light of a certain spectrum (e.g., the visible spectrum or the infrared spectrum) and convey information constituting an image as electrical signals (e.g., analog or digital signals). For example, the image sensors 214 and 216 may include CCDs or active pixel sensors in a CMOS. The image sensors 214 and 216 may detect light incident through a respective lens (e.g., a fisheye lens). In some implementations, the image sensors 214 and 216 include digital-to-analog converters. In some implementations, the image sensors 214 and 216 are held in a fixed orientation with respective fields of view that overlap.

The communications interface 218 may enable communications with a personal computing device (e.g., a smartphone, a tablet, a laptop computer, or a desktop computer). For example, the communications interface 218 may be used to receive commands controlling image capture and processing in the image capture device 210. For example, the communications interface 218 may be used to transfer image data to a personal computing device. For example, the communications interface 218 may include a wired interface, such as a high-definition multimedia interface (HDMI), a universal serial bus (USB) interface, or a FireWire interface. For example, the communications interface 218 may include a wireless interface, such as a Bluetooth interface, a ZigBee interface, and/or a Wi-Fi interface.

The user interface 220 may include an LCD display for presenting images and/or messages to a user. For example, the user interface 220 may include a button or switch enabling a person to manually turn the image capture device 210 on and off. For example, the user interface 220 may include a shutter button for snapping pictures.

The battery 222 may power the image capture device 210 and/or its peripherals or functional features, for example, the microphones and the speakers that serve as the audio components 118 of FIGS. 1A and 1B. The battery 222 may be charged wirelessly or through a micro-USB interface.

Figure 3B:
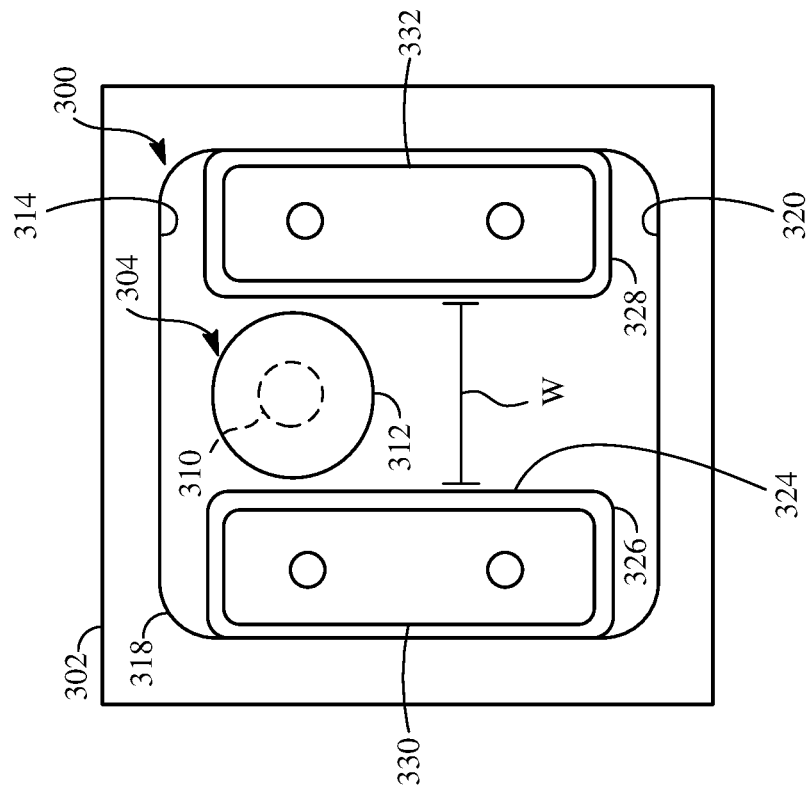
FIG. 3B is a front detail view of the drainage system of FIG. 3A without the cover.
Figure 3A:
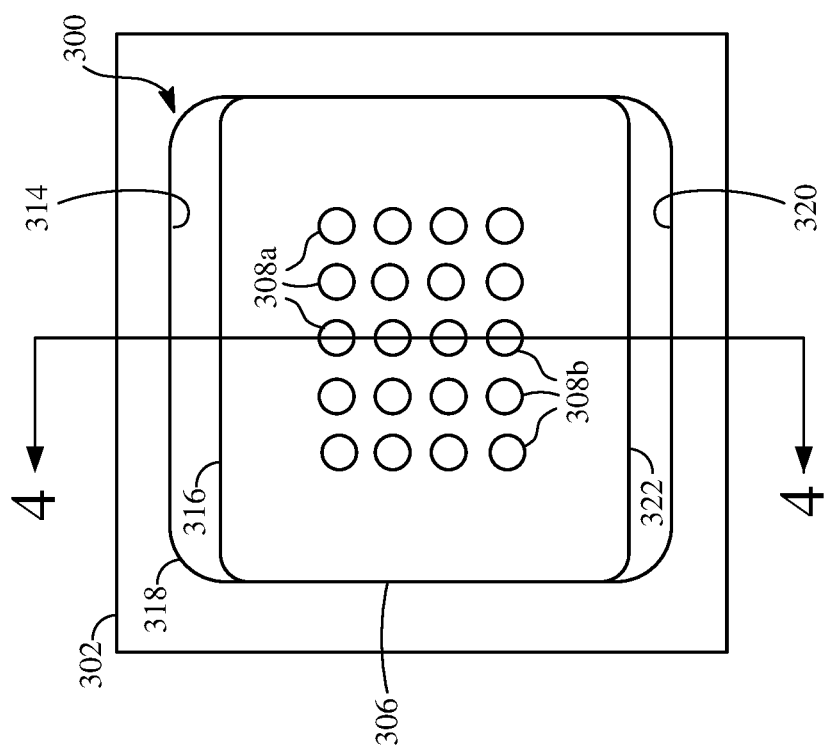
FIG. 3A is a front detail view of a drainage system.

FIGS. 3A and 3B are front detail views of a drainage system 300 for an image capture device. The image capture device may be similar to the image capture device 100 described in reference to FIGS. 1A-1C. For example, the image capture device may include electronics (e.g., imaging electronics, power electronics, etc.) internal to a body or housing 302 for capturing images via lenses and/or performing other functions such as image processing. The image capture device may also include various indicators and interfaces such as lights, buttons, and/or displays in other locations on the housing 302 (not shown in FIGS. 3A and 3B) that allow a user to interact with the image capture device. Only a portion of the housing 302 is shown in the detail views of FIGS. 3A and 3B to allow for clarity in description of the drainage system 300.

The drainage system 300 shown in FIGS. 3A and 3B is used to drain liquids such as water from an audio assembly 304 (FIG. 3B) disposed within, on, and/or through the housing 302 of the image capture device. The drainage system 300 and the audio assembly 304 may be located on a surface of the image capture device, such as a front face or a rear face of the housing 302, in a position similar to that shown for the audio components 118 located adjacent to the lenses 104, 106 of the image capture device 100 in FIGS. 1A and 1B. Other locations for the drainage system 300 and the audio assembly 304 on the image capture device are also possible. In addition, multiple drainage systems 300 may be present to drain liquid from multiple audio assemblies 304 on a single image capture device.

The drainage system 300 includes a cover 306 (FIG. 3A) that protects the audio assembly 304 disposed beneath the cover 306 from an environment external to the image capture device. For example, the audio assembly 304 can be delicate, flexible, and/or otherwise susceptible to damage based on impact from touch, debris, etc. The cover 306 may include one or more cover apertures 308a configured to allow ambient audio to pass through the cover 306 to the audio assembly 304, for example, when the image capture device is operating outside of a liquid environment. The cover apertures 308a shown in FIG. 3A are located both adjacent to and outboard of the audio assembly 304 shown in FIG. 3B in respect to the housing 302 when the cover 306 is secured to the housing 302, allowing a short path for ambient audio to travel through the cover apertures 308a in the cover 306 to the audio assembly 304.

The cover 306 may define additional cover apertures 308b both proximate to and/or spaced from to the cover aperture 308a that are arranged in a pattern configured to drain moisture through the cover 306 when the image capture device emerges from a liquid. In the example of FIG. 3A, the cover apertures 308a, 308b are shown as part of a rectangular pattern of rows and columns, though other patterns are also possible. In addition, some or all of the cover apertures 308a, 308b may be formed as detents in the cover 306, not through holes, in which case neither ambient audio nor liquid would pass through the cover 306 at the location the dummy-type or detent-only cover apertures (not shown). Dummy-type or detent-only cover apertures may serve as industrial design features for the image capture device, whereas the through-hole type cover apertures 308a, 308b allow air, liquid, or both to travel through the cover 306.

The housing 302 may define an audio aperture 310. The audio assembly 304 may be coupled to the housing 302 at the location of the audio aperture 310. In this way, ambient audio can pass through or around the cover 306 and into the audio assembly 304 via the audio aperture 310. A single audio aperture 310 is shown as defined through the housing 302 in FIG. 3B, but multiple audio apertures are also possible, and the size, shape, and number of audio apertures depend on the construction and location of the audio assembly 304. For example, the audio assembly 304 may include a single microphone (not shown) that is configured to convert ambient audio into an electrical signal. The microphone may be coupled to an interior surface of the housing 302 at the location of the single audio aperture 310.

The audio assembly 304 may also include a waterproof membrane 312 that is configured to allow ambient audio to pass through the audio aperture 310 to components of the audio assembly 304. At the same time, the waterproof membrane 312 prevents moisture from passing through the audio aperture 310 to prevent damage or hindered performance, for example, of a microphone disposed within the housing 302. In the example shown in FIG. 3B, the waterproof membrane 312 is coupled to an exterior surface of the housing 302 in a manner that covers the audio aperture 310 and is sized larger than the audio aperture 310 in order to provide the waterproofing feature.

The drainage system 300 includes an inlet 314 defined between the housing 302 and the cover 306. The inlet 314 is an opening between a first edge 316 of the cover 306 and a cover depression 318 defined in the housing 302. In the example shown in FIG. 3A, the first edge 316 is an upper edge, though other edges of the cover 306 could serve as the first edge as well. The cover depression 318 is shown as a rounded-edged bowl or basin that receives the cover 306 such that an exterior surface of the cover 306 is coplanar with an exterior surface of the housing 302. The inlet 314 allows both air and fluid to enter the drainage system 300 can be a path of least resistance for ambient audio to enter the audio assembly 304 when the image capture device that includes the housing 302 is held in the orientation shown in FIGS. 3A and 3B.

The drainage system 300 includes an outlet 320 defined between the housing 302 and the cover 306. The outlet 320 is an opening between a second edge 322 of the cover 306 and the cover depression 318 defined in the housing 302. In the example shown in FIG. 3A, the second edge 322 is a lower edge that runs generally parallel to the first edge 316, though other edges of the cover 306 could serve as the second edge as well (for example, edges that are perpendicular instead of parallel to the first edge 316). The outlet 320 allows fluid to exit the drainage system 300 when the image capture device that includes the housing 302 is held in the orientation shown in FIGS. 3A and 3B. Additional details related to the movement of fluid through the drainage system 300 are described in respect to FIGS. 4A-4C as is indicated by the sectional designation in FIG. 3A.

The drainage system 300 includes a drainage channel 324 that extends from the inlet 314 to the outlet 320 between an interior surface of the cover 306 and an exterior surface of the housing 302 in order to drain moisture from the audio assembly 304 when the image capture device including the housing 302 emerges from liquid (e.g., from water). In the example of FIG. 3B, the exterior surface of the housing 302 is an exterior surface of the cover depression 318 defined in the housing 302. The drainage channel 324 also runs between cover stanchions 326, 328 that rise out of the cover depression 318 to allow the cover 306 to be secured over the drainage channel 324, for example, using adhesive pads 330, 332 coupled to tops of the cover stanchions 326, 328. The width W of the drainage channel 324 may be between 5 mm and 10 mm, for example. Though two cover stanchions 326, 328 and adhesive pads 330, 332 are shown for adhering the cover 306 to the housing 302 and defining the sides of the drainage channel 324, other numbers and/or locations for these components are also possible.

The size and shape of the inlet 314 and the outlet 320 are such that ambient audio is able to pass through the inlet 314 along the drainage channel 324 to the audio assembly 304 at a predetermined time period after the image capture device including the housing 302 emerges from a liquid (e.g., water) even if the cover apertures 308a, 308b and a lower portion of the drainage channel 324 remain blocked by the liquid. This predetermined time period may be from 0-3 seconds or from 0-5 seconds, for example. This is an improvement when compared to a time period required to allow apertures exposed to liquid to air dry. For example, air drying wet apertures may take 15-30 minutes depending on ambient conditions. Performance of the audio assembly 304 after the image capture device emerges from liquid is thus greatly improved due to the presence of the drainage channel 324.

FIGS. 4A-4C are sectional views of the drainage system 300 of FIGS. 3A-3B as the drainage system 300 moves from submerged in water as shown in FIG. 4A to emerged from water as shown in FIG. 4C. The housing 302 of the image capture device is shown in cross-section with the audio assembly 304 disposed beneath the cover 306. The upper cover apertures 308a move from occluded with liquid in FIG. 4A to empty of liquid in FIG. 4C as the image capture device including the housing 302 emerges, for example, from water. The lower cover apertures 308b remain occluded with liquid in all three of FIGS. 4A-4C as the predetermined time period between the positions in each of the FIGS. 4A-4C is short, such as 0 to 5 seconds, and surface tension prevents some of the liquid from escaping the lower cover apertures 308b.

The audio assembly 304 is shown in detail as disposed on two sides of the audio aperture 310. For example, the waterproof membrane 312 is shown in a position exterior to the audio aperture 310 and a microphone 400 is shown in a position interior to the audio aperture 310 as the audio aperture 310 is defined in the housing 302. The microphone 400 can be coupled to the housing 302, for example, by being disposed on a printed circuit board (PCB) 402 that is press fit or otherwise secured to the housing 302 using a gasket 404. Other means of aligning and securing the microphone 400 to the housing 302 are also possible. The waterproof membrane 312 can be coupled to the housing 302, for example, using an adhesive 406 to secure the waterproof membrane 312 to the housing 302 across the audio aperture 310. Other means of aligning and securing the waterproof membrane 312 to the housing 302 are also possible.

The drainage system 300 includes the inlet 314 defined between the first edge 316 of the cover 306 and the surface of the cover depression 318, the outlet 320 defined between the second edge 322 of the cover 306 and the surface of the cover depression 318, and the drainage channel 324 extending between the inlet 314 and the outlet 320, behind the cover 306, along the outer surfaces of the cover depression 318 and the waterproof membrane 312. In this example, the outer surfaces of the cover depression 318 and the waterproof membrane 312 are generally coplanar to encourage liquid drainage through the drainage channel 324 as is shown in the progression of water levels from FIG. 4A-FIG. 4C.

In order to encourage rapid removal of fluid (e.g., water) from the waterproof membrane 312 of the audio assembly 304 while constraining the overall size of the drainage system 300, the audio assembly 304 and the audio aperture 310 can be located a predetermined distance A from the outlet 320 of the drainage system 300. For example, the distance A may be between 5 mm and 10 mm. In contrast, a depth B of the drainage channel 324, a thickness C of the cover 306, and a height D of the cover apertures 308a, 308b may have smaller values, for example, ranging between 0.5 mm and 2 mm in order to allow the inlet 314, the outlet 320, and the drainage channel 324 to encourage fluid flow across and away from the audio assembly 304 in a manner that both takes advantage of gravity and sufficiently overcomes surface tension in a short time period (e.g., a time period between 0 and 5 seconds). As seen in FIGS. 4B and FIG. 4C, though water remains at a lower end of the drainage channel 324 and within the lower cover apertures 308b due to surface tension, ambient audio can reach the audio assembly 304 via both the inlet 314 and the upper cover apertures 308a very quickly given the construction of the drainage channel 324.

Figure 5B:
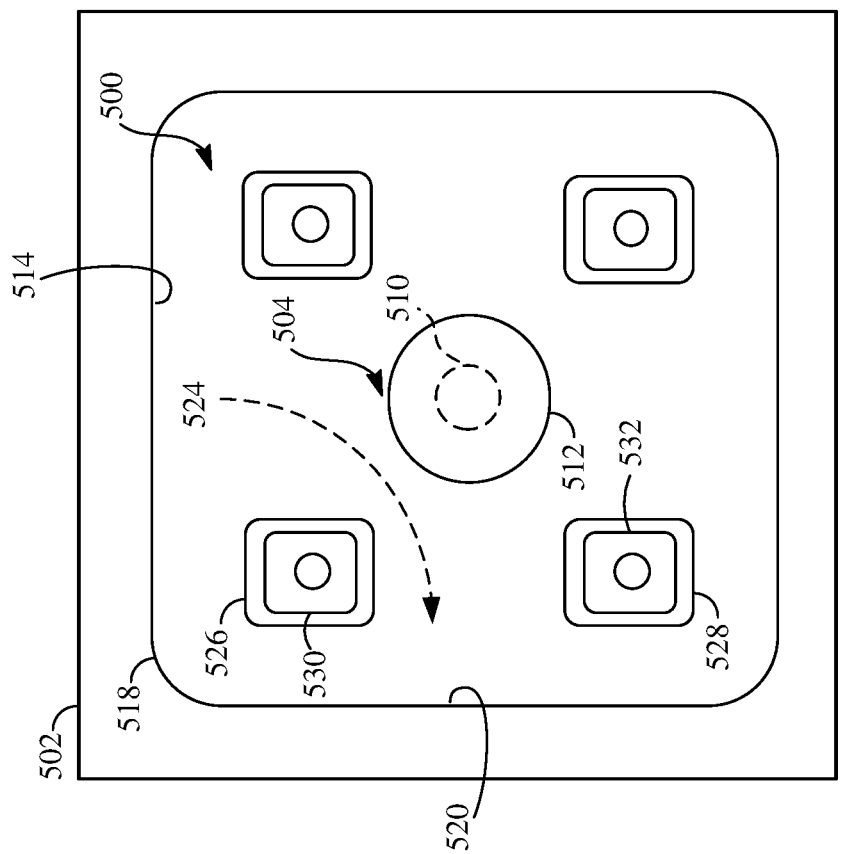
FIG. 5B is a front detail view of the drainage system of FIG. 5A without the cover.
Figure 5A:
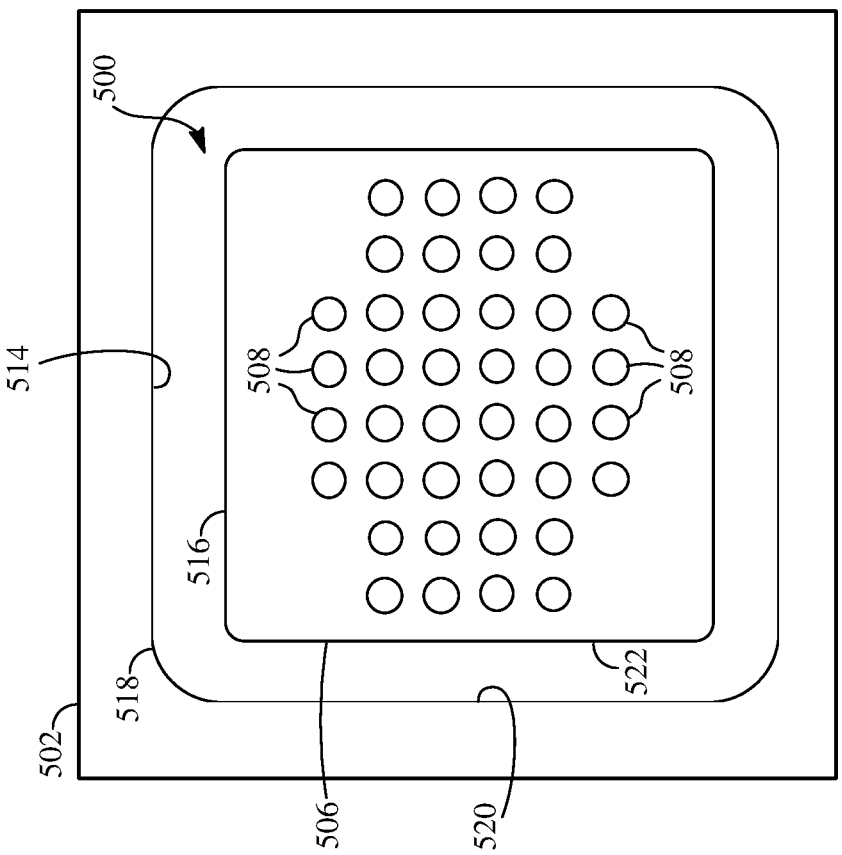
FIG. 5A is a front detail view of another drainage system.

FIGS. 5A and 5B are front detail views of another drainage system 500 for an image capture device. The drainage system 500 may be similar to the drainage system 300 described in reference to FIGS. 3A-3B and FIGS. 4A-4C. Only a portion of a housing 502 is shown in the detail views of FIGS. 5A and 5B to allow for clarity in description of the drainage system 500. The drainage system 500 is used to drain liquids from an audio assembly 504 (FIG. 5B) disposed within, on, and/or through the housing 502 of the image capture device.

The drainage system 500 includes a cover 506 (FIG. 5A) that protects the audio assembly 504 disposed beneath the cover 506 from an environment external to the image capture device. The cover 506 may include one or more cover apertures 508 configured to allow ambient audio to pass through the cover 506 to the audio assembly 504, for example, when the image capture device is operating outside of a liquid environment. The cover apertures 508 shown in FIG. 5A are located both adjacent to and outboard of the audio assembly 504 shown in FIG. 5B in respect to the housing 502 when the cover 506 is secured to the housing 502, allowing a short path for ambient audio to travel through the cover apertures 508 in the cover 506 to the audio assembly 504.

In the example of FIG. 5A, the cover apertures 508 are shown as part of a cross-shaped pattern of rows and columns, though other patterns are also possible. In addition, some or all of the cover apertures 508 may be detents in the cover 506, not through holes, in which case neither ambient audio nor liquid would pass through the cover 506 at the location the dummy-type or detent-only cover apertures (not shown). Dummy-type or detent-only cover apertures may serve as industrial design features for the image capture device, whereas the through-hole type cover apertures 508 allow air, liquid, or both to travel through the cover 506.

The housing 502 may define an audio aperture 510. The audio assembly 504 may be coupled to the housing 502 at the location of the audio aperture 310. In this way, ambient audio can pass through or around the cover 506 and into the audio assembly 504 via the audio aperture 510. A single, centrally-located audio aperture 510 is shown as defined through the housing 502 in FIG. 5B, but multiple audio apertures are also possible, and the size, shape, location, and number of audio apertures depend on the construction and location of the audio assembly 504. For example, the audio assembly 504 may include a single microphone (not shown) that is configured to convert ambient audio into an electrical signal. The microphone may be coupled to an interior surface of the housing 502 at the location of the single audio aperture 510.

The audio assembly 504 may also include a waterproof membrane 512 that is configured to allow ambient audio to pass through the audio aperture 510 to components of the audio assembly 504. At the same time, the waterproof membrane 512 prevents moisture from passing through the audio aperture 510 to prevent damage or hindered performance, for example, of a microphone disposed within the housing 502. In the example shown in FIG. 5B, the waterproof membrane 512 is coupled to an exterior surface of the housing 502 in a manner that covers the audio aperture 510 and is sized larger than the audio aperture 510 in order to provide the waterproofing feature. Coupling of the waterproof membrane 512 and the housing may be achieved, for example, using adhesive (not shown).

The drainage system 500 includes an inlet 514 defined between the housing 502 and the cover 506. The inlet 514 is an opening between a first edge 516 of the cover 506 and a cover depression 518 defined in the housing 502. In the example shown in FIG. 5A, the first edge 516 is an upper edge, though other edges of the cover 506 could serve as the first edge as well. The cover depression 518 is shown as a rounded-edged bowl or basin that receives the cover 506 such that an exterior surface of the cover 506 is coplanar with an exterior surface of the housing 502. The inlet 514 allows both air and fluid to enter the drainage system 500.

The drainage system 500 includes an outlet 520 defined between the housing 502 and the cover 506. The outlet 520 is an opening between a second edge 522 of the cover 506 and the cover depression 518 defined in the housing 502. In the example shown in FIG. 5A, the second edge 522 is a side edge that runs both adjacent to and generally perpendicular to the first edge 516, though other edges of the cover 506 could serve as the second edge as well (for example, edges that are parallel instead of perpendicular to the first edge 516). The outlet 520 allows fluid to exit the drainage system 500 when the image capture device that includes the housing 502 emerges from a liquid in an orientation rotated ninety degrees counter-clockwise from the orientation shown in FIGS. 5A and 5B. In other words, the outlet 520 allows liquid to drain from the drainage system 500 when an imaging device including the housing 502 emerges from liquid while held sideways, for example, by a user pulling the imaging device from the liquid.

The drainage system 500 includes a drainage channel 524 that extends from the inlet 514 to the outlet 520 between an interior surface of the cover 506 and an exterior surface of the housing 502 in order to drain moisture from the audio assembly 504 when the image capture device including the housing 502 emerges from a liquid (e.g., from water). In the example of FIG. 5B, the exterior surface of the housing 502 is an exterior surface of the cover depression 518 defined in the housing 502. The drainage channel 524 also runs between cover stanchions 526, 528 that rise out of the cover depression 518 to allow the cover 506 to be secured over the drainage channel 524, for example, using adhesive pads 530, 532 coupled to tops of the cover stanchions 526, 528.

Though two cover stanchions 526, 528 and adhesive pads 530, 532 are numbered in FIG. 5B, a total of four cover stanchions and adhesive pads are present to adhere the cover 506 to the housing 502 and define the sides of the various possible drainage channels (including the drainage channel 524) that would act to allow air to reach and to remove liquid from the audio assembly 504 depending on an orientation of the housing 502 of the image capture device as it emerges from a liquid. In the example of FIG. 5B, there are four possible drainage channels, some of which would drain liquid at the same time should the housing 502 emerge from a liquid at an orientation, for example, forty-five degrees from the shown orientation in FIGS. 5A and 5B. Similarly, though the inlet 514 and the outlet 520 are as indicated, there are four possible inlets and outlets for the drainage system 500 of FIGS. 5A and 5B, with the entry and exit of both air and liquid dependent upon an orientation of the housing 502. Other numbers and/or locations for the stanchion and adhesive components are also possible.

The size and shape of the inlet 514 and the outlet 520 are such that ambient audio is able to pass through the inlet 514 along the drainage channel 524 to the audio assembly 504 at a predetermined time period after the image capture device including the housing 502 emerges from a liquid (e.g., water) even if the cover apertures 508 and a portion of the drainage channel 524 remain blocked by the liquid. This predetermined time period may be from 0-3 seconds, for example. A distance between the cover stanchions 526, 528 may be similar in value to a distance between the cover stanchions 326, 328 of FIGS. 3A and 3B, making a width of the drainage channel 524 similar to the width W of the drainage channel 324 at a location of the stanchions 326, 328.

Figure 6B:
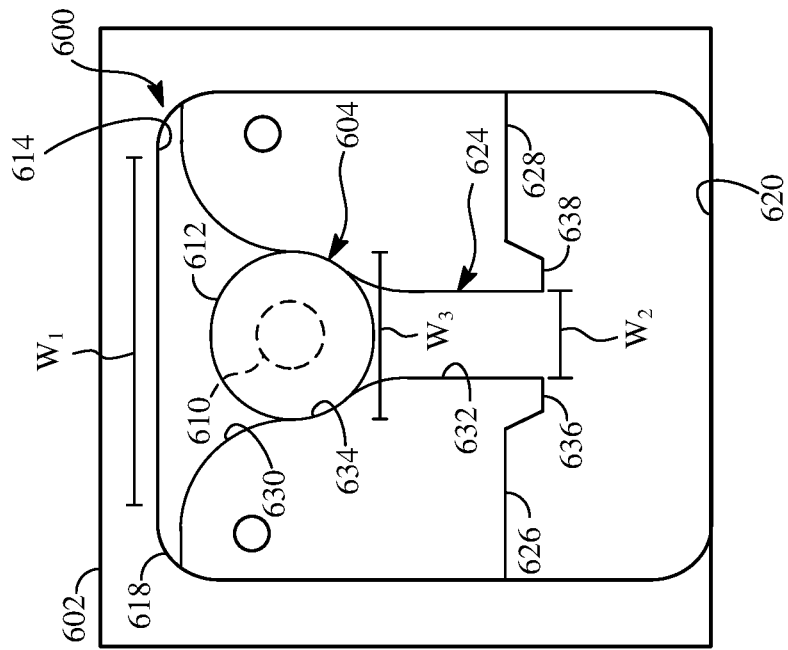
FIG. 6B is a front detail view of the drainage system of FIG. 6A without the cover.
Figure 6A:
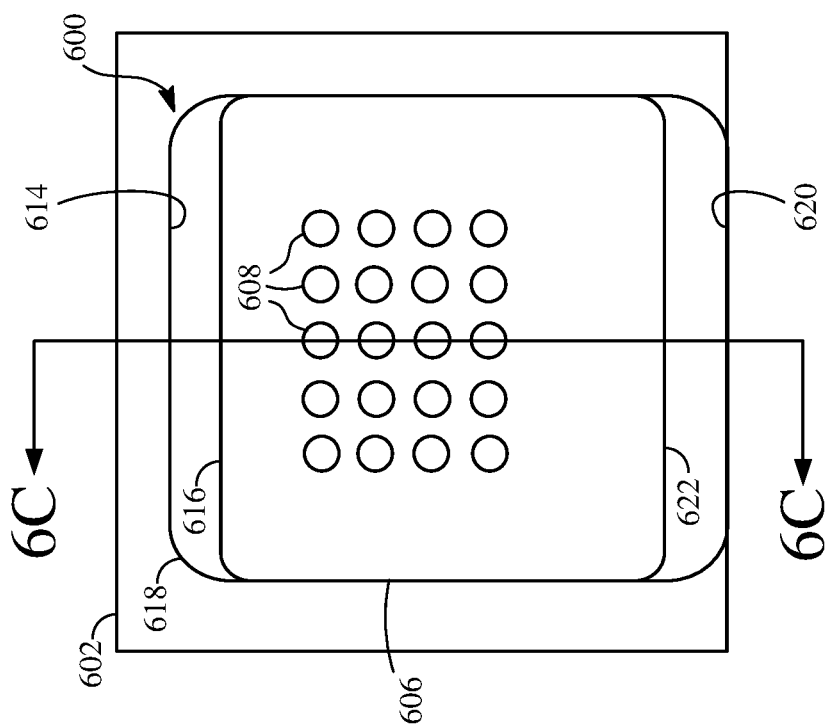
FIG. 6A is a front detail view of a drainage system.

FIGS. 6A and 6B are front detail views of a drainage system 600. The drainage system 600 moves liquid (e.g., water or another liquid, not shown) across or through a housing 602 so that an audio assembly 604 (FIG. 6B and 6C) is kept free of obstruction from the liquid. Disposed on the housing 602 and covering the audio assembly 604, a cover 606 (FIG. 6A and 6C) forms an upper portion of the drainage system 600, and the housing 602 forms a bottom portion and/or side portions of the drainage system 600. Thus, the audio assembly 604 is protected from physical external interference. In this configuration, the cover 606 includes apertures 608 (FIGS. 6A and 6C), which are similar to the apertures 308a, 308b, 508 of FIGS. 3A, 4A-4C, and 5A to assist with draining or moving the liquid away from the audio assembly 604 while still protecting the audio assembly 604. In some examples, the apertures 608 are patterned over the audio assembly 604 to improve audio projection and reception and to drain liquid from the drainage system 600. In other configurations, the apertures 608 may be absent from the cover 606.

Figure 6C:
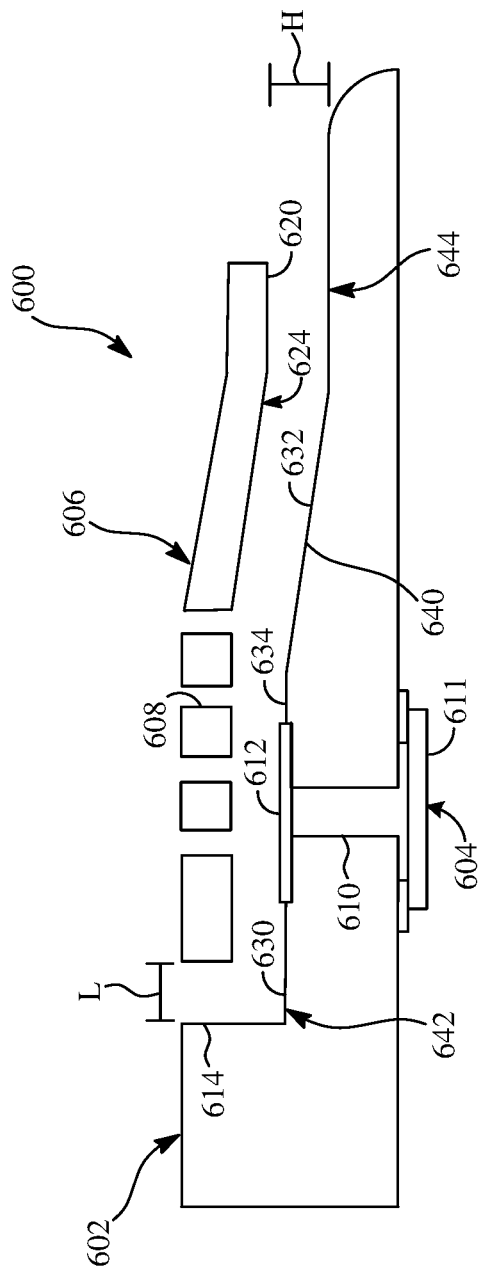
FIG. 6C is a sectional view of the drainage system of FIGS. 6A-6B.

The audio assembly 604 functions to receive sound, project sound, or both from below a surface of the housing 602, and the audio assembly 604 may be similar to the audio assemblies 304, 504 of FIGS. 3B, 4A-4C, and 5B. The housing 602 includes an audio aperture 610 defined within or through the housing 602. Attached to an interior portion of the housing 602, an audio device 611 (FIG. 6C) (e.g., a microphone) of the audio assembly 604 may be positioned within the audio aperture 610 (FIGS. 6B and 6C) and protected by a waterproof membrane 612 (FIG. 6B and 6C).

The entire drainage system 600 functions to move the liquid quickly and efficiently over the audio assembly 604 so that the audio assembly 604 remains partially unobstructed by the liquid. At an inlet 614 positioned between a first edge 616 (FIG. 6A) of the cover 606 and an edge of the housing 602, the liquid can pass through a cover depression 618 (FIGS. 6A and 6B) defined within the housing 602 because the cover depression 618 is in a plane below the cover 606. On the other side of the cover 606, an outlet 620 is positioned between a second edge 622 of the cover 606 (FIG. 6A) and the housing 602. The outlet 620 is used to move the liquid away from the audio assembly 604 and the drainage system 600. With this configuration, the liquid can be flushed from the audio assembly 604 through the inlet 614, between the cover 606 and the audio assembly 604, and out the outlet 620, which improves the audio capabilities of the audio assembly 604.

The inlet 614, the cover 606, the housing 602, and the outlet 620 collectively form a drainage channel 624 (FIGS. 6B and 6C) that passes through stanchions 626, 628 (FIG. 6B) for facilitating movement of the liquid and supporting the cover 606 above the housing 602. The stanchions 626, 628 may couple the cover 606 to the housing 602. The stanchions 626, 628 may be similar or function similarly to the stanchions 326, 328, 526, 528 of FIGS. 3B and 5B. The stanchions 626, 628, in tandem, form a tapered or funneled shape for the drainage channel 624 for directing the liquid downstream of the audio assembly 604. While directing the liquid downstream, some of the liquid may be drained by way of the apertures 608, which creates a combination drainage configuration that keeps the audio assembly 604 free of liquid obstruction. In some configurations, more than two stanchions (e.g., FIG. 5B) may be used to both direct the liquid down a tapered or funneled pathway and direct the liquid between multiple inlets or outlets (e.g., FIG. 5B). As an example, stanchions (not shown) may be patterned in a foursome and fully support the cover 606 so that the cover 606 is free of contact with the housing 602 and the liquid is drained between the stanchions (not shown) and down the tapered or funneled shape. In this example, the liquid can be drained out of multiple inlets or outlets (not shown), which improves the rate of liquid flow. In another example, the stanchions 626, 628 can have a tapered structure, that is, a funnel-like shape, to form sides of the drainage channel 624 so that liquid is directed downstream from the audio assembly 604.

The drainage channel 624 has a tapered shape so that the liquid is efficiently funneled from the inlet 614 to the outlet 620 when the drainage system 600 is in the shown orientation. Near the inlet 614, a first portion 630 (FIGS. 6B and 6C) of the drainage channel 624 has a width $W_1$ that is large so that more of the liquid can flow through the inlet 614 and down the drainage channel 624. At the outlet 620, the liquid flows to a second portion 632 (FIGS. 6B and 6C) that has a width $W_2$ that is less than the width $W_1$. Between the first portion 630 and the second portion 632, the liquid is funneled over the audio assembly 604 at a third portion 634 (FIGS. 6B and 6C) of the drainage channel 624 (e.g. an audio portion or audio channel) that has a width $W_3$ that is less than the width $W_1$ of the first portion 630 and more than the width $W_2$ of the second portion 632. In this configuration, the liquid bottle necks below at least a portion of the audio assembly 604 so that the audio assembly 604 is partially unobstructed while the liquid drains from the drainage channel 624. The width $W_1$ may range between about 4 mm to about 10 mm. The width $W_2$ may range between about 0.5 mm to about 6 mm. The width $W_3$ may range between about 4 mm to about 8 mm. At an end of the drainage channel 624, flanges 636, 638 (FIG. 6B) adjacent to or forming part of the stanchions 626, 628 are configured to direct the liquid out of the second portion 632 and into a large section of the drainage channel 624 proximate to or integrated with the outlet 620 so that the liquid can be drained from the drainage channel 624.

FIG. 6C is a sectional view of the drainage system 600 of FIGS. 6A-6B. Supporting the drainage system 600, the housing 602 includes the audio assembly 604 with the audio device 611 positioned below an exterior surface of the housing 602 and within the housing 602 at a location of the audio aperture 610. At the exterior surface of the housing 602, the waterproof membrane 612 covers the audio aperture 610 and the audio assembly 604, with these components protected by the cover 606.

At the inlet 614, the cover 606 and the housing 602 are separated by a length L which, in part, controls the amount of liquid that is flow-able into the drainage system 600 and, subsequently, between the first portion 630, the third portion 634, and the second portion 632 of the continuous drainage channel 624. As described in respect to FIGS. 6A-6B, the drainage channel 624 at the widths $W_1$, $W_2$, $W_3$ is tapered. As shown in FIG. 6C, the drainage channel 624 has a height H that is relatively uniform along the first portion 630, the third portion 634, and the second portion 632. The height H and/or the length L may range between about 0.5 mm to about 2 mm. The length L may be equal to, greater than, or less than the height H. In some examples (not shown), the height H of the drainage channel 624 may be tapered in a similar fashion as the widths $W_1$, $W_2$, $W_3$ to control the flow of the liquid through the drainage channel 624.

To further control flow in the drainage channel 624, the housing 602 includes a surface with a slope 640 (FIG. 6C) proximate to or integrated with the second portion 632. For example, the slope 640 may facilitate the flow of liquid away from the audio assembly 604 when the drainage system 600 is positioned on a side of an image capture device, such as the image capture device 100 of FIG. 1A-1C, and the image capture device is positioned with a front surface and a rear surface in a generally horizontal direction (e.g., the image capture device is rested on a front or a back instead of on a top or a bottom of the image device). Any other part of the housing 602 may include another surface with a slope (not shown) that supports flow from the inlet 614 to the outlet 620.

In the example shown in FIG. 6C, the slope 640, which also may be referred to as a connecting level or a sloped structure, separates the drainage channel 624 into a first level 642 (FIG. 6C) associated with the audio assembly 604 and the inlet 614 and a second level 644 (FIG. 6C) associated with the outlet 620. The first level 642 and the second level 644 are shown parallel to each other. In other examples, the levels 642, 644 can be positioned in another non-parallel, vertically-staggered configuration with the first level 642 at a depth into the housing 602 that is less than that of the second level 644. The levels 642, 644 can be connected by the slope 640 that gradually transitions between depths into the housing 602. In other configurations, the drainage channel 624 may include more or fewer levels (not shown) to improve flow efficiency from the inlet 614 to the outlet 620. As the liquid flows from the first level 642, down the slope 640, and to the second level 644, the liquid can gain momentum to be more efficiently flushed out of the drainage system 600.

The cover 606 is FIG. 6C is shown as extending parallel to the entire surface of the housing 602, including the slope 640, so that the cover 606 also includes a sloped surface and liquid is efficiently directed to the outlet 620. However, in other configurations, a plane (not shown) extending through the cover 606 may be offset from a plane (not shown) extending through the slope 640 or any other surface of the housing 602 so that the liquid is moved more efficiently to the outlet 620. The inlet 614 and the outlet 620 are shown as generally perpendicular from each other so that when the liquid flows through the drainage channel 624, the liquid exits the outlet 620 without being obstructed by a wall or a surface of the housing 602, the outlet 620, or both. In other configurations, the inlet 614 and the outlet 620 can be parallel so that the cover 606, the inlet 614, and the outlet 620 are within the same plane (e.g., in the example described in respect to FIGS. 4A-4C).

The drainage systems 300, 500, 600 in this application are described as associated with image capture devices such as the image capture device 100 or the image capture device 210. The drainage systems 300, 500, 600 may also be used with other electronic devices including audio components that would benefit from rapid removal of liquids, for example, image capture devices with a single image sensors and/or portable electronic devices without image sensors that include audio components. Additional examples of electronic devices that could implement the drainage systems 300, 500, 600 described in this application include hand-held audio recorders, remote control devices with voice control, and smart phones. Other electronic devices are also possible.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

In some examples, an image capture device includes a housing that defines a cavity with a base surface and lateral surfaces and an aperture positioned within the cavity and defined through the base surface; an audio device disposed within the housing at a location of the aperture; a membrane extended across the aperture so that the audio device is separated from the cavity; stanchions that extend outward from the base surface and are free of contact with the lateral surfaces; and a cover coupled to the stanchions, wherein the cover is free of contact with the housing.

In some examples, the stanchions may laterally taper from an inlet to an outlet relative to the lateral surfaces, and wherein the inlet and the outlet are defined at different locations with respect to the cover and the housing. The stanchions, the cover, and the housing may define a channel that extends over the audio device, and wherein the channel is configured to drain fluids from the audio device. The stanchions may include four or more stanchions that define four or more openings to the channel between the housing and the cover. The stanchions may include three or more stanchions that define three or more openings to the channel between the housing and the cover. The audio device may be centered under the cover. The audio device may be positioned at a location that is off-centered under the cover. The cover may include apertures positioned over the audio device and configured to facilitate sound wave transmission to or from the audio device. The cover may be aligned with a top edge of the cavity.

In some examples, the image capture device includes a housing that comprises a receptacle; an audio device disposed within the receptacle and configured to receive and/or emit audio waves; a cover that comprises a pattern of apertures and is connected with the housing over the audio device; a channel in fluid communication with an external environment and that extends over the audio device and between the cover and the housing; and a membrane that extends over the audio device and separates the audio device from the channel. The membrane may have a width that is less than a width of a total width of the pattern of apertures on the cover. The channel and the pattern of apertures may drain fluids from the audio device.

In some examples, the channel may have a width and/or a height that is uniform along a length of the channel. The pattern of apertures on the cover may be off-set relative to the audio device. The pattern of apertures may include apertures and detents. The audio device may include a microphone, a speaker, or both.

In some examples, an image capture device includes a housing; an audio aperture defined within the housing, the audio aperture acoustically coupled to an audio device; a cover connected with the housing and positioned over the audio aperture and configured to protect the audio device; a channel that extends from an inlet, between the cover and audio aperture, to an outlet, wherein the outlet extends in a manner perpendicular to the inlet and perpendicular to a top surface of the cover; and a pattern of apertures defined within the cover, wherein the pattern of apertures extend through the cover in a direction that is perpendicular relative to the inlet or the outlet.

In some examples, the channel may slope downward from the inlet to the outlet. The cover may have an angled surface that slopes downward from the inlet to the outlet. The cover comprises a pattern of apertures configured to drain fluids from the audio aperture. The image capture device may further include a membrane that covers the audio aperture and separates the channel and the audio device. The inlet may have a width that is larger than a width of the outlet.

What is claimed is:

1. An image capture device, comprising:
    a housing that defines a cavity with a base surface and lateral surfaces and an aperture positioned within the cavity and defined through the base surface;
    an audio device disposed within the housing at a location of the aperture;
    a membrane extended across the aperture so that the audio device is separated from the cavity;
    stanchions that extend outward from the base surface and are free of contact with the lateral surfaces; and
    a cover coupled to the stanchions, wherein the cover is free of contact with the housing.

2. The image capture device of claim 1, wherein the stanchions laterally taper from an inlet to an outlet relative to the lateral surfaces, and wherein the inlet and the outlet are defined at different locations with respect to the cover and the housing.

3. The image capture device of claim 1, wherein the stanchions, the cover, and the housing define a channel that extends over the audio device, and wherein the channel is configured to drain fluids from the audio device.

4. The image capture device of claim 3, wherein the stanchions comprise four or more stanchions that define four or more openings to the channel between the housing and the cover.

5. The image capture device of claim 3, wherein the stanchions comprise three or more stanchions that define three or more openings to the channel between the housing and the cover.

6. The image capture device of claim 1, wherein the audio device is centered under the cover.

7. The image capture device of claim 1, wherein the audio device is positioned at a location that is off-centered under the cover.

8. The image capture device of claim 5, wherein the cover comprises apertures positioned over the audio device and configured to facilitate sound wave transmission to or from the audio device.

9. The image capture device of claim 1, wherein the cover is aligned with a top edge of the cavity.

10. An image capture device, comprising:
    a housing that comprises a receptacle;
    an audio device disposed within the receptacle and configured to receive and/or emit audio waves;
    a cover that comprises a pattern of apertures and is connected with the housing over the audio device;
    a channel in fluid communication with an external environment and that extends over the audio device and between the cover and the housing; and
    a membrane that extends over the audio device and separates the audio device from the channel,
    wherein the membrane has a width that is less than a width of a total width of the pattern of apertures on the cover, and wherein the channel and the pattern of apertures are configured to drain fluids from the audio device.

11. The image capture device of claim 10, wherein the channel has a width and/or a height that is uniform along a length of the channel.

12. The image capture device of claim 10, wherein the pattern of apertures on the cover are off-set relative to the audio device.

13. The image capture device of claim 11, wherein the pattern of apertures comprises apertures and detents.

14. The image capture device of claim 13, wherein the audio device comprises a microphone, a speaker, or both.

15. An image capture device, comprising:
a housing;
an audio aperture defined within the housing, the audio aperture acoustically coupled to an audio device;
a cover connected with the housing and positioned over the audio aperture and configured to protect the audio device;
a channel that extends from an inlet, between the cover and audio aperture, to an outlet, wherein the outlet extends in a manner perpendicular to the inlet and perpendicular to a top surface of the cover; and
a pattern of apertures defined within the cover, wherein the pattern of apertures extend through the cover in a direction that is perpendicular relative to the inlet or the outlet.

16. The image capture device of claim 15, wherein the channel slopes downward from the inlet to the outlet.

17. The image capture device of claim 16, wherein the cover has an angled surface that slopes downward from the inlet to the outlet.

18. The image capture device of claim 15, wherein the cover comprises a pattern of apertures configured to drain fluids from the audio aperture.

19. The image capture device of claim 18, wherein the image capture device further comprises a membrane that covers the audio aperture and separates the channel and the audio device.

20. The image capture device of claim 19, wherein the inlet has a width that is larger than a width of the outlet.

* * * * *